(12) United States Patent
Crigler et al.

(10) Patent No.: US 9,879,804 B2
(45) Date of Patent: Jan. 30, 2018

(54) DUCT COUPLER DEVICES, SYSTEMS, AND RELATED METHODS

(71) Applicant: Structural Technologies, LLC, Hanover, MD (US)

(72) Inventors: John Richard Crigler, Woodbine, MD (US); Gus Dean Hammonds, Grand Prairie, TX (US); Robert William Sward, Keller, TX (US); Gregory A. Hunsicker, Dallas, TX (US)

(73) Assignee: Structural Technologies, LLC, Hanover, MD (US)

( * ) Notice: Subject to any disclaimer, the term of this patent is extended or adjusted under 35 U.S.C. 154(b) by 348 days.

(21) Appl. No.: 14/306,834

(22) Filed: Jun. 17, 2014

(65) Prior Publication Data

US 2014/0367961 A1   Dec. 18, 2014

Related U.S. Application Data

(60) Provisional application No. 61/835,962, filed on Jun. 17, 2013.

(51) Int. Cl.
*F16L 13/11*         (2006.01)
*E04C 5/10*          (2006.01)

(52) U.S. Cl.
CPC .............. *F16L 13/113* (2013.01); *E04C 5/10* (2013.01)

(58) Field of Classification Search
CPC .................................. F16L 13/113; E04C 5/10
See application file for complete search history.

(56) References Cited

U.S. PATENT DOCUMENTS 768,228 A      8/1904   Hurst
1,385,606 A    7/1921   Christensen
(Continued)

FOREIGN PATENT DOCUMENTS

JP     S63 78946 A    4/1988
JP     H11 10629 A    1/1999
(Continued)

OTHER PUBLICATIONS

International Preliminary Report on Patentability for PCT/US2014/042718 dated Dec. 22, 2015 (6 pages).*

(Continued)

*Primary Examiner* — Rodney Mintz
(74) *Attorney, Agent, or Firm* — Jenkins, Wilson, Taylor & Hunt, P.A.

(57) ABSTRACT

Coupler devices, systems, and related methods for coupling ducts are provided. In some aspects, a duct coupling device includes a hollow body, at least one coupler seal disposed about an outer surface of the body, and a plurality of apertures extending through the body for facilitating the passage of a fluid and/or any other medium therethrough. A duct coupling system includes a duct coupling device with a sealing member, coupler transitions adapted to receive the duct coupling device, and a sealing member. The sealing member is configured to seal an annular space disposed between a first surface of the duct coupling device and a surface of one of the first and second ducts. A method of coupling ducts includes providing a first coupler transition on a first duct, providing a second coupler transition on a second duct, and providing a duct coupling device between the first and second coupler transitions.

23 Claims, 7 Drawing Sheets

(56) References Cited

U.S. PATENT DOCUMENTS

| | | | |
|---|---|---|---|
| 1,988,694 A | 1/1935 | Mallay | |
| 2,261,948 A | 11/1941 | Beach | |
| 2,342,422 A | 2/1944 | Morehead et al. | |
| 2,789,844 A | 4/1957 | Kessler | |
| 3,585,771 A | 6/1971 | Pinniger | |
| 3,691,708 A | 9/1972 | Firnkas | |
| 3,765,707 A | 10/1973 | Westberg | |
| 3,867,804 A | 2/1975 | Wilson | |
| 4,202,568 A | 5/1980 | Strom | |
| 4,773,198 A | 9/1988 | Reinhardt | |
| 4,799,307 A | 1/1989 | Reigstad et al. | |
| 4,884,830 A * | 12/1989 | Meisinger | F16L 37/121 285/102 |
| 4,900,063 A | 2/1990 | Baarfusser et al. | |
| 4,900,193 A | 2/1990 | MacKinnon | |
| 5,180,196 A | 1/1993 | Skinner | |
| 5,231,936 A | 8/1993 | Kikuchi et al. | |
| 5,320,391 A | 6/1994 | Luthi | |
| 5,338,070 A | 8/1994 | Horikawa et al. | |
| 5,345,742 A | 9/1994 | Rogowsky et al. | |
| 5,437,072 A | 8/1995 | Dinis et al. | |
| 5,474,335 A | 12/1995 | Sorkin | |
| 5,478,123 A | 12/1995 | Kanao | |
| 5,560,163 A | 10/1996 | Carlton | |
| 5,775,849 A | 7/1998 | Sorkin | |
| D400,670 S | 11/1998 | Sorkin | |
| 5,947,533 A | 9/1999 | Fisher et al. | |
| 5,954,373 A | 9/1999 | Sorkin | |
| 6,142,536 A | 11/2000 | Wolfsdorf | |
| 6,389,764 B1 | 5/2002 | Stubler et al. | |
| 6,752,435 B1 | 6/2004 | Sorkin | |
| 6,761,002 B1 | 7/2004 | Sorkin | |
| 6,764,105 B1 | 7/2004 | Sorkin | |
| 6,834,890 B2 | 12/2004 | Sorkin | |
| 6,874,821 B1 | 4/2005 | Sorkin | |
| 7,267,375 B1 | 9/2007 | Sorkin | |
| 7,273,238 B1 | 9/2007 | Sorkin | |
| 7,621,103 B1 | 11/2009 | Sorkin | |
| 7,686,347 B1 | 3/2010 | Sorkin | |
| 7,695,021 B1 | 4/2010 | Sorkin | |
| 8,136,845 B2 | 3/2012 | Patel et al. | |
| 9,423,059 B1 * | 8/2016 | Sorkin | E04C 5/10 |
| 9,493,951 B2 * | 11/2016 | Sorkin | E04C 5/00 |
| 9,695,964 B2 * | 7/2017 | Sorkin | E04C 5/00 |
| 2004/0056483 A1 * | 3/2004 | Sorkin | F16L 25/0018 285/230 |
| 2007/0252389 A1 | 11/2007 | Milici et al. | |
| 2011/0101679 A1 | 5/2011 | Crigler | |
| 2015/0211665 A1 * | 7/2015 | Sorkin | F16L 13/113 285/417 |
| 2015/0330544 A1 * | 11/2015 | Sorkin | E04C 5/00 285/369 |
| 2017/0009916 A1 * | 1/2017 | Sorkin | E04C 5/00 |

FOREIGN PATENT DOCUMENTS

| | | |
|---|---|---|
| JP | 2002/030610 A | 1/2002 |
| JP | 2009/133179 A | 6/2009 |
| WO | WO-89/06766 A1 | 7/1989 |
| WO | WO-2006/099900 A2 | 9/2006 |
| WO | WO-2014/204947 A1 | 12/2014 |

OTHER PUBLICATIONS

International Search Report for Application No. PCT/US 2014/042718 dated Nov. 14, 2014.
Notification of Transmittal of the International Search Report and the Written Opinion of the International Searching Authority, or the Declaration for International Application No. PCT/US2010/052470 (Dec. 27, 2010).
Restriction Requirement for U.S. Appl. No. 12/903,696 dated Aug. 22, 2012.
Non-Final Office Action for U.S. Appl. No. 12/903,696 dated Oct. 26, 2012.
Final Office Action for U.S. Appl. No. 12/903,696 dated Apr. 26, 2013.
Non-Final Office Action for U.S. Appl. No. 12/903,696 dated Mar. 12, 2014.
Final Office Action for U.S. Appl. No. 12/903,696 dated Aug. 6, 2014.
Advisory Action Action for U.S. Appl. No. 12/903,696 dated Oct. 17, 2014.
Non-Final Office Action for U.S. Appl. No. 12/903,696 dated Nov. 13, 2014.
Final Office Action for U.S. Appl. No. 12/903,696 dated Apr. 20, 2015.
Applicant-Initated Interview Summary U.S. Appl. No. 12/903,696 dated Mar. 11, 2015.
Interview Summary for U.S. Appl. No. 12/903,696 dated Mar. 11, 2015.
Advisory Action for U.S. Appl. No. 12/903,696 dated Jul. 27, 2015.
Non-Final Office Action for U.S. Appl. No. 12/903,696 dated Sep. 9, 2015.

* cited by examiner

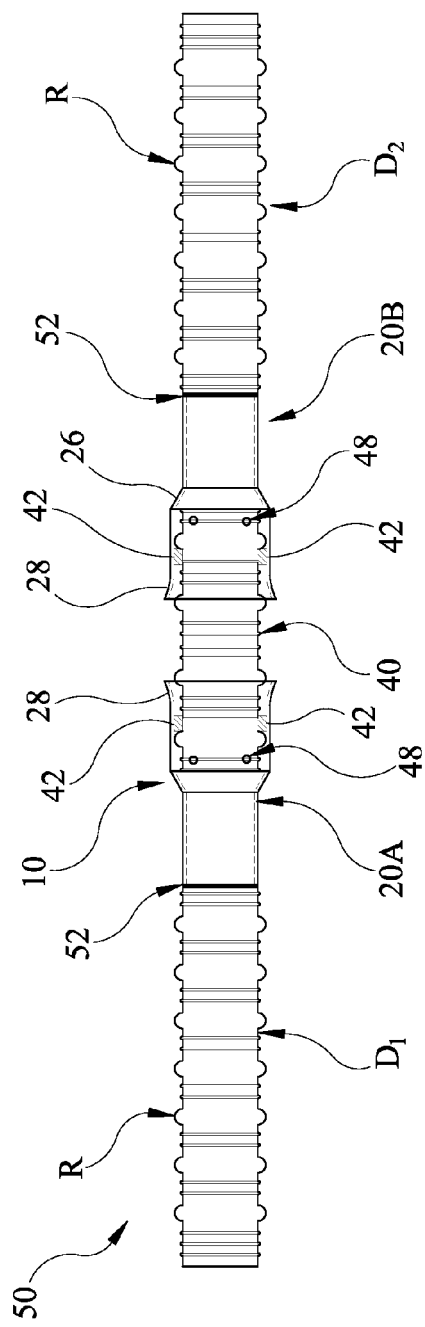
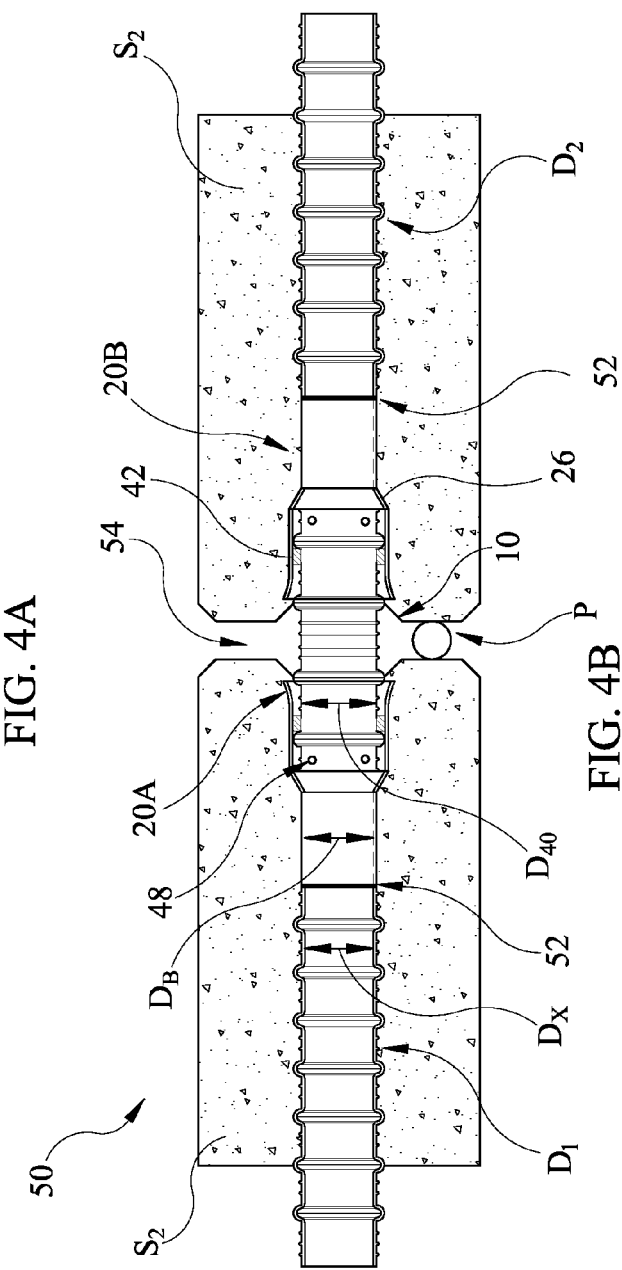

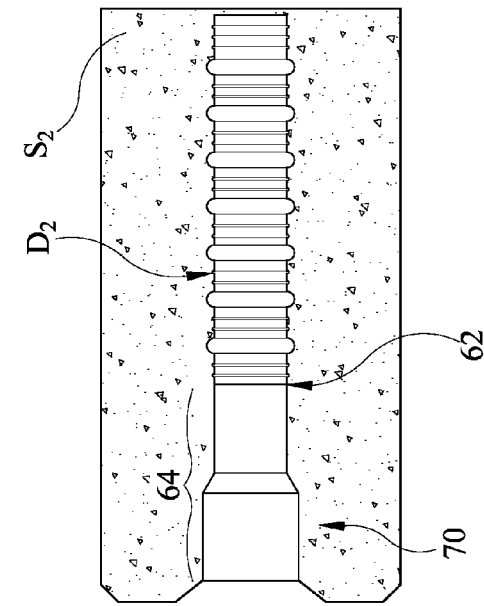
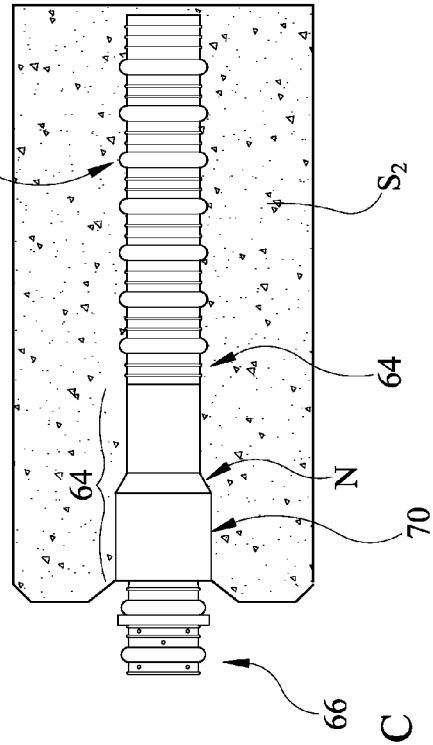
FIG. 5B
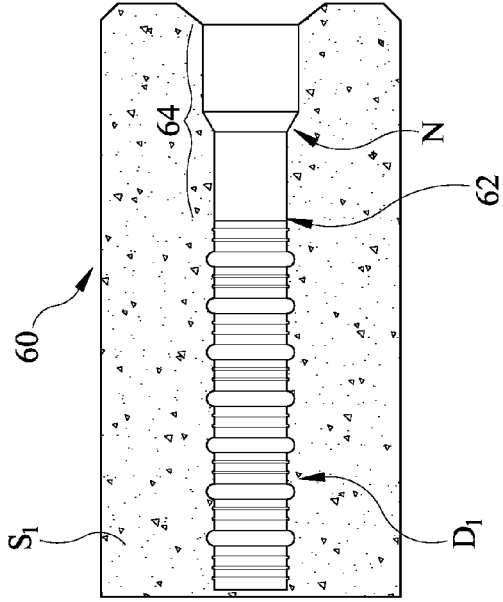
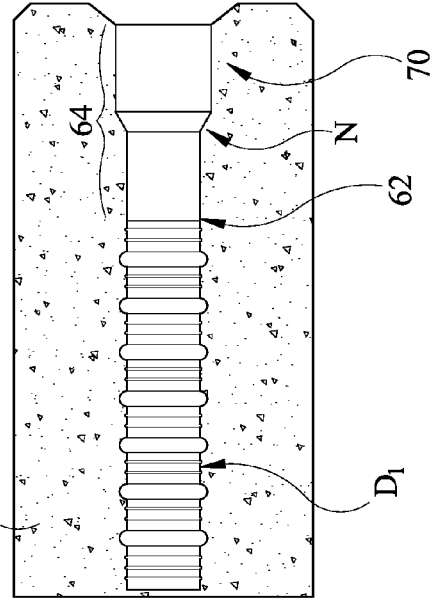
FIG. 5C

DUCT COUPLER DEVICES, SYSTEMS, AND RELATED METHODS

CROSS-REFERENCE TO RELATED APPLICATION

This application claims priority to U.S. Provisional Patent Application Ser. No. 61/835,962, filed on Jun. 17, 2013, the disclosure of which is fully incorporated herein by reference in its entirety.

TECHNICAL FIELD

The subject matter disclosed herein relates generally to devices, systems, and related methods for coupling one or more components. More specifically, the subject matter disclosed herein relates to devices, systems, and related methods for coupling ducts for use in construction and/or concrete segments.

BACKGROUND

Structural systems for building and construction commonly utilize concrete segments which can assemble together to form structural elements such as bridges and roadways. In constructing concrete segments, the concrete is typically poured around flexible internal members, for example, ducts which are capable of coupling end-to-end to form water-tight seals. Once fully constructed, the ends of the segmental ducts can be at least partially located on outer faces of the concrete segments. The segmental ducts within the concrete segments can couple together upon sealing the faces of the concrete segments with epoxy, concrete, or grout, and form a network of ducts into which post-tensioning elements, such as metal strands or rods, can be inserted to compress the segments together. The ducts can protect the post-tensioning elements from corrosive elements including salt and other de-icing chemicals which may accumulate on bridges and roadways.

Many approaches have tried to address problems of efficiently and inexpensively sealing the joints between adjacent sections of duct contained within concrete segment applications. Problems can arise, for example, when joining and sealing the concrete segments according to conventional designs, as the coupled joints can be time consuming to assemble, involve intricate mechanical fasteners, and/or require costly and environmentally unfriendly materials. Consequently, there remains a need for improved devices, systems, and methods for coupling ducts that overcome or alleviate shortcomings of prior art coupling devices.

SUMMARY

Improved devices, systems, and related methods for coupling ducts are provided. Such devices, systems, and methods exhibit improved sealing between ducts and/or pre-cast concrete segments, improved efficiency in coupling ducts and/or pre-cast concrete segments, and improved ease of assembly of pre-cast concrete segments, all at a lowered cost of manufacture.

In some aspects, a duct coupling device comprise a hollow body, at least one coupler seal disposed about an outer surface of the body, and a plurality of apertures extending through the body for facilitating the passage of a fluid and/or any other medium therethrough.

A duct coupling system comprises a duct coupling device with a sealing member, coupler transitions adapted to receive the duct coupling device, and a sealing member. The sealing member is configured to seal an annular space disposed between a first surface of the duct coupling device and a surface of one of the first and second ducts.

A method for coupling ducts is also provided. The method comprises providing a first coupler transition on a first duct, providing a second coupler transition on a second duct, and providing a duct coupling device between the first and second coupler transitions. The duct coupling device comprises a sealing member configured to seal an annular space between a surface of the duct coupling device and surfaces of each coupler transition.

BRIEF DESCRIPTION OF THE DRAWINGS

A full and enabling disclosure of the instant subject matter including the best mode thereof to one of ordinary skill in the art is set forth more particularly in the remainder of the specification, including reference to the accompanying figures in which:

FIGS. 4A through 5D illustrate further embodiments of coupling systems for assembling concrete segments in accordance with the subject matter disclosed herein.

DETAILED DESCRIPTION

Reference will now be made in detail to possible embodiments of the present subject matter, one or more examples of which are shown in the figures. Each example is provided to explain the subject matter and not as a limitation. In fact, features illustrated or described as part of one embodiment can be used in another embodiment to yield still a further embodiment. It is intended that the subject matter disclosed and envisioned herein covers such modifications and variations.

As illustrated in the various figures, some sizes of structures or portions are exaggerated relative to other structures or portions for illustrative purposes and, thus, are provided to illustrate the general structures of the present subject matter. Furthermore, various aspects of the present subject matter are described with reference to a structure or a portion being formed on other structures, portions, or both. As will be appreciated by those of skill in the art, references to a structure being formed "on" or "above" another structure or portion contemplates that additional structure, portion, or both may intervene.

References to a structure or a portion being formed "on" another structure or portion without an intervening structure or portion are described herein as being formed "directly on" the structure or portion. Similarly, it will be understood that when an element is referred to as being "connected", "attached", or "coupled" to another element, it can be directly connected, attached, or coupled to the other element, or intervening elements may be present. In contrast, when an element is referred to as being "directly connected", "directly attached", or "directly coupled" to another element, no intervening elements are present.

Furthermore, relative terms such as "on", "above", "upper", "top", "lower", or "bottom" are used herein to describe one structure's or portion's relationship to another structure or portion as illustrated in the figures. It will be understood that relative terms such as "on", "above", "upper", "top", "lower" or "bottom" are intended to encompass different orientations of the device in addition to the orientation depicted in the figures. For example, if the device in the figures is turned over, structure or portion described as "above" other structures or portions would now be oriented "below" the other structures or portions. Likewise, if devices in the figures are rotated along an axis, structure or portion described as "above", other structures or portions would now be oriented "next to" or "left of" the other structures or portions. Like numbers refer to like elements throughout.

Unless the absence of one or more elements is specifically recited, the terms "comprising", including", and "having" as used herein should be interpreted as open-ended terms that do not preclude the presence of one or more elements.

Figure 1:
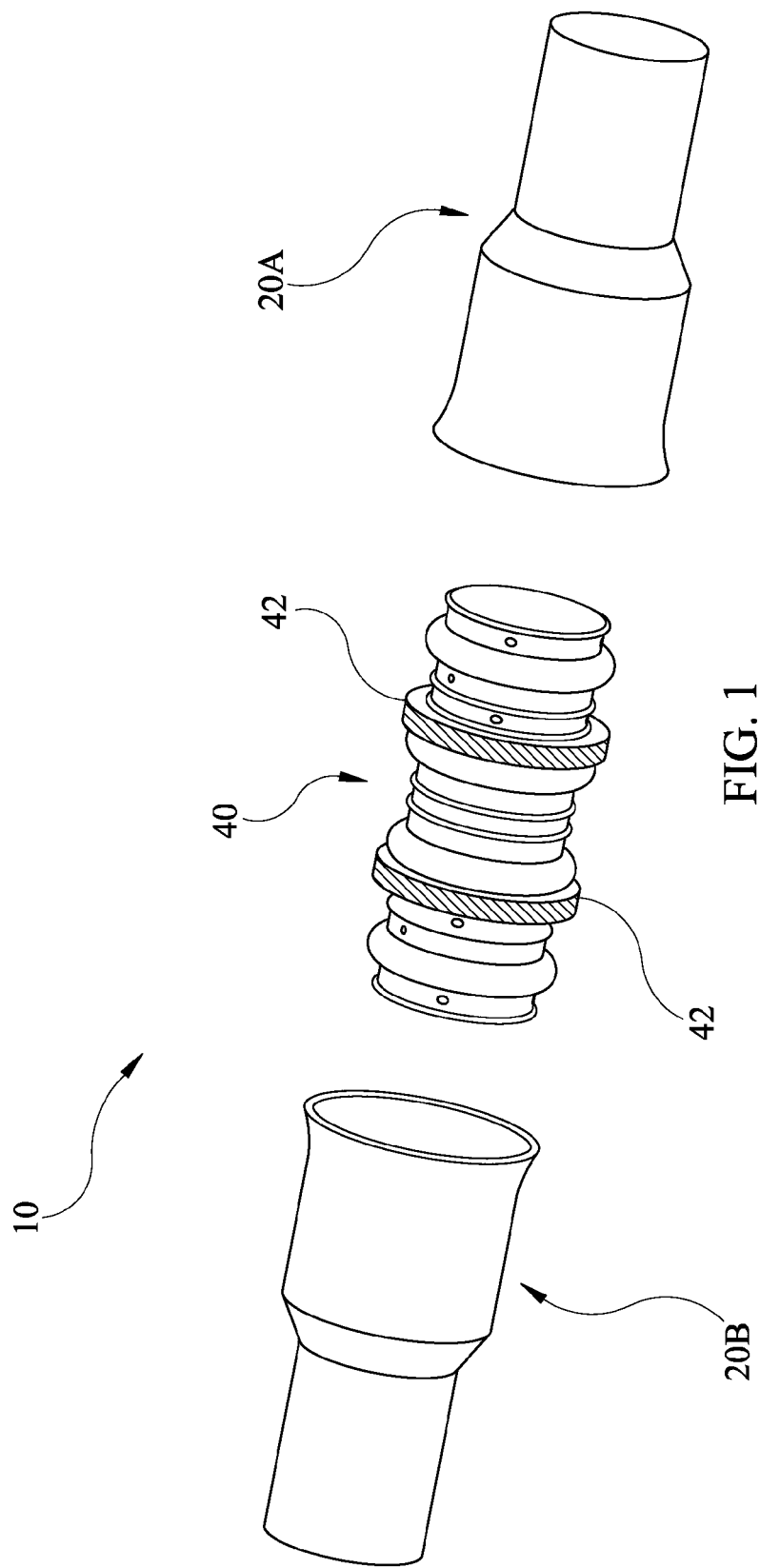
FIG. 1 illustrates a perspective view of a coupling system incorporating a coupling device in accordance with the subject matter disclosed herein.
Figure 2:
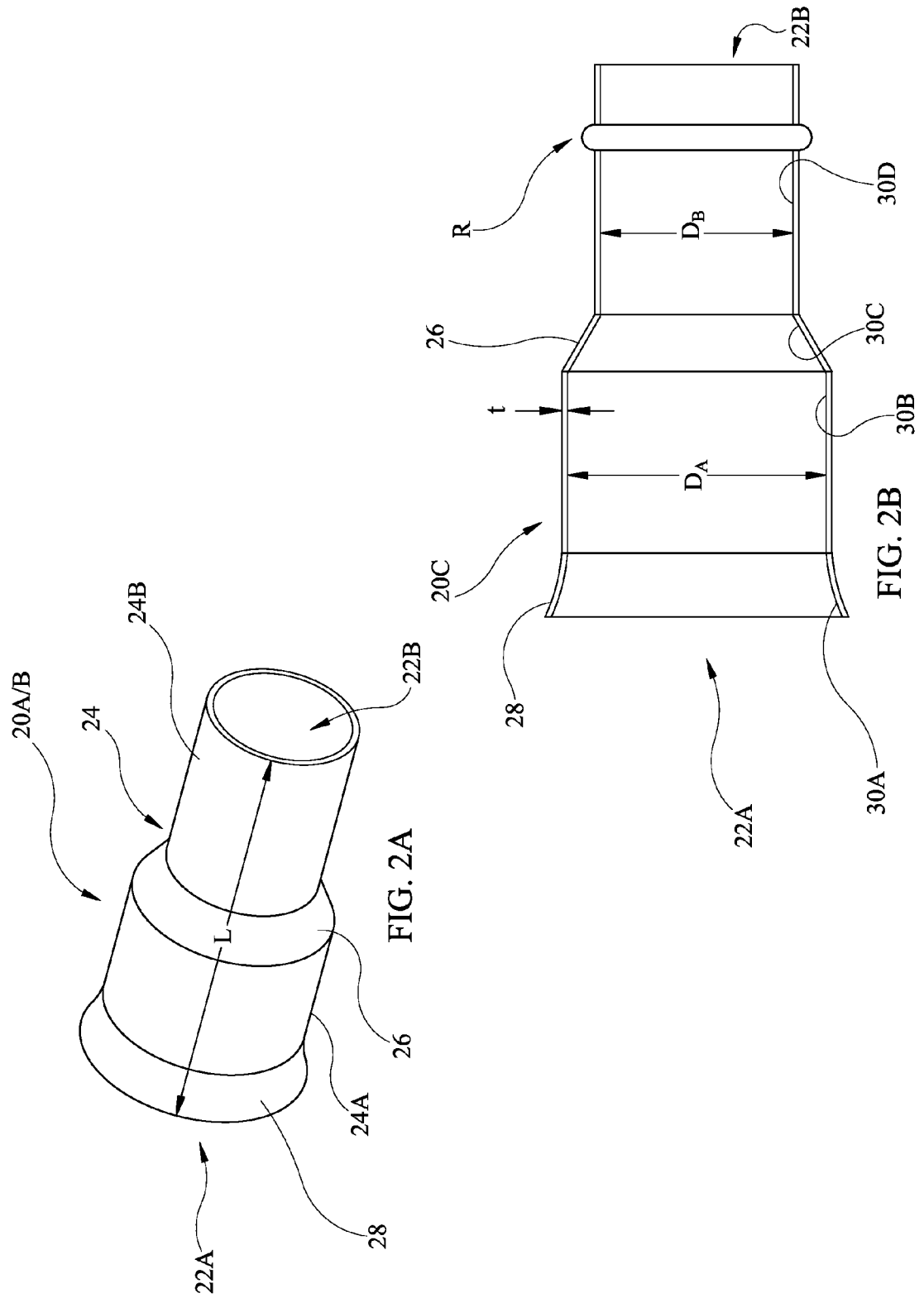
FIGS. 2A and 2B are perspective and sectional views, respectively, illustrating outer coupler transition members of the coupling system in accordance with the subject matter disclosed herein.

Embodiments of the present subject matter will be described with reference to FIGS. 1-5D. FIG. 1 illustrates a coupler or coupling system, generally designated 10, for coupling multiple components such as, for example, ducts and/or concrete segments. In some aspects, system 10 is used for assembling ducts either prior to the ducts being cast within concrete or after the ducts are cast within concrete. As FIGS. 4B to 5D illustrate, one or more portions of coupling systems described herein are optionally configured for pre-casting within concrete. In some aspects, coupling system 10 is configured to assemble, join, integrate, seal, and/or otherwise connect concrete segments at a work-site thereby forming structural elements such as bridges, buildings, structures, and/or roadways.

Referring to FIG. 1, system 10 comprises one or more outer portions or transition components disposed about at least one inner portion or coupler component for facilitating coupling between adjacent concrete segments and respective duct segments optionally pre-cast therein. System 10 can comprise at least one outer coupler transition member configured for installation on a duct or duct segment. In some aspects, at least two (e.g., multiple) outer coupler transition members, generally designated 20A and 20B, are provided on and/or installed to at least two opposing ducts (e.g., $D_1$, $D_2$, FIGS. 4B to 5D). Coupler transitions or transition members 20A and 20B are adapted to receive an inner coupler member or coupling device, generally designated 40. In some aspects, system 10 comprises two opposing transition members 20A and 20B adapted to receive the coupler or coupling device 40 therebetween. Coupling device 40 is adapted to engage and/or frictionally seal against inner surfaces of opposing transition members 20A and 20B thereby coupling the members via one or more coupler seals 42. For illustration and visibility purposes, coupler seals 42 are indicated in shaded lines.

Figure 3:
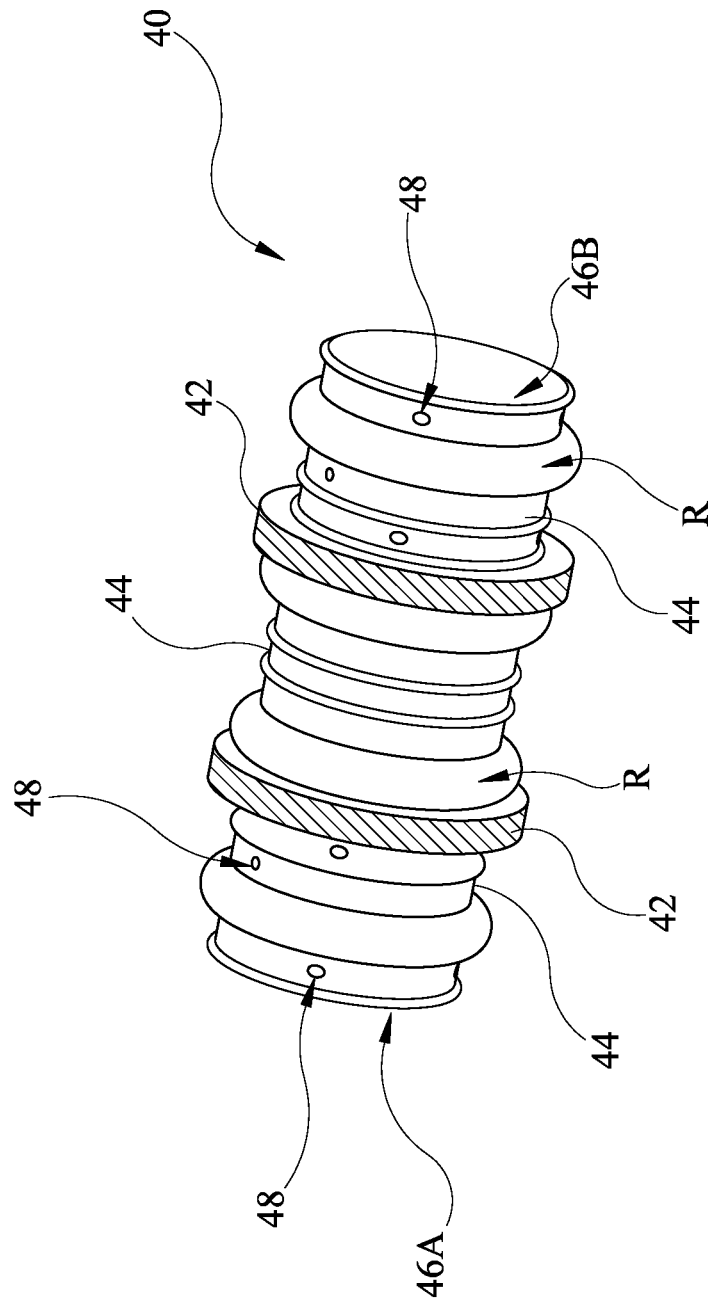
FIG. 3 is a perspective view illustrating a perspective view of a coupler or coupling device in accordance with the subject matter disclosed herein.

FIGS. 2A and 2B illustrate outer coupler transition members in more detail and FIG. 3 illustrates coupling device in more detail. Referring now to FIGS. 2A and 2B, transition members 20A and 20B (i.e., designated "20A/B") and 20C are illustrated. Coupler transition members 20A and 20B can be cut, assembled, and/or installed (e.g., via welding, etc.) to ducts on a job site as needed. Coupler transition members 20A/B and 20C can comprise variable inner and outer diameters for transitioning from a smaller, first diameter corresponding to a duct diameter (e.g., $D_X$, FIG. 4B), to a larger, second diameter configured to receive and fixedly retain coupling device 40. As FIG. 2A illustrates, transition members 20A/B can be devoid of a rib or ribbed body.

However, as FIG. 2B illustrates and in some aspects, transition member 20C can comprise an optional rib, generally designated R, multiple ribs, and/or at least a partially corrugated body. In some aspects, provision of one or more ribs R is advantageous, as ribs can improve retention and/or the shear strength associated therewith.

Referring to FIGS. 2A and 2B, coupler transition members 20A to 20C can each comprise an elongated and hollow body 24 disposed between a first end 22A and a second, opposing end 22B. In some aspects, first end 22A is adapted to receive a coupler or coupling device (e.g., 40, FIGS. 1 and 3) and second end 22B is adapted to couple or attach to a segmental duct or duct segment (e.g., $D_1$ or $D_2$, FIGS. 4A to 5B). In some aspects, second end 22B is welded (or otherwise coupled) to a duct segment. However, any joining process can be utilized for joining ducts and transition members. Body 24 comprises a first portion 24A proximate first end 22A and a second portion 24B proximate second end 22B. Body 24 can be hollow, thereby allowing communication of fluid, material, and/or strands or tendons therebetween. Body 24 can comprise a neck or transition region 26, which is inclined and disposed between first and second body portions 24A and 24B, respectively. In some aspects, an inner diameter of body 24 can transition to a larger/smaller diameter via transition region 26.

In some aspects, transition members 20A to 20C are flared and/or comprise an optional flared opening or surface 28 proximate one end. When present, flared surface 28 can comprise a radius of curvature of approximately 1 inch (in) or more; approximately 2 in or more; or more than approximately 3 in. First and second portions of body 24A and 24B, respectively, transition region 26, and flared surface 28 can comprise any suitable length, such that body 24 sums to a total and overall length L of approximately 4 in or more; approximately 5 in or more; approximately 6 in or more; or more than 8 in. The length, diameter, sectional shape, and any other dimension associated with transition members 20A to 20C can be customized per request, specification, and/or coupling job or application.

As FIG. 2B illustrates, transition members, for example, transition member 20C can comprise a variable inner diameter corresponding to a variable outer diameter. In some aspects, body 24 is hollow and comprises a first inner diameter $D_A$ proximate first end 22A and a second inner diameter $D_B$ proximate second end 22B. Neck or transition region 26 can be disposed between first and second inner diameters $D_A$ and $D_B$, respectively. In some aspects, first inner diameter $D_A$ comprises approximately 3 in or more; approximately 4 in or more; approximately 5 in or more; or more than approximately 6 in. In some aspects, second inner diameter $D_B$ comprises approximately 1 in or more; approximately 2 in or more; approximately 3 in or more; or more than approximately 4 in.

In some aspects, second inner diameter $D_B$ substantially corresponds to approximately a same diameter of a duct segment to be joined therewith (e.g., $D_X$, FIG. 4B). That is, second portion 24B is configured to attach or engage a duct segment (e.g., $D_2$, FIG. 4A), and the two portions (e.g., 24B and $D_2$) can comprise approximately a same inner diameter such that passage of metallic rods, bars, strands, or tendons therethrough is not inhibited. In some aspects, inner and/or outer diameters $D_A$ and $D_B$ of transition members can be customized per customer request, job, specification, and/or application.

In some aspects, one or more tendons, strands, materials, fluids, and/or grout (e.g., G, FIG. 5D) can be disposed between and/or configured to communicate between passages comprised first and second inner diameters $D_A$ and $D_B$ of transition members 20A to 20C. Transition members 20A to 20C can comprise an inner surface, which varies, for example, in diameter along a length of each transition member 20A to 20C. For example, inner surface comprises a first inclined portion 30A proximate the optional flared end 22A, a first planar portion 30B defining constant diameter $D_A$, a second inclined portion 30C disposed proximate transition region 26, and a second planar portion 30D defining constant second diameter $D_A$. Transition members 20A to 20C can comprise any suitable wall thickness t (FIG. 2B), for example, approximately 0.2 in or more; 0.25 in or more; or more than 0.5 in. The wall thickness t of transition members 20A to 20C can also be customized, where desired.

Still referring to FIG. 2B and in some aspects, transition members 20A to 20C are configured to attach to and/or couple ducts or duct segments (e.g., $D_1$, $D_2$, FIG. 4A) comprising a minimum diameter of approximately 150 millimeters (mm) (6 inches), for example, ducts that are approximately 130 mm (5 inches) or less; approximately 115 mm (4.5 inches) or less; approximately 100 mm (4 inches) or less; approximately 85 mm (3.5 inches) or less; approximately 76 mm (3 inches) or less; approximately 59 mm (2.3 inches) or less; or less than 48 mm (2 inches).

Referring now to FIG. 3, coupling device 40 is illustrated in more detail. Coupling device 40 comprises a coupler or inner coupling member adapted for positioning between and/or coupling portions of one or more transition members 20A to 20C. In some aspects, coupling device 40 is configured to seal and/or frictionally engage an inner surface (e.g., 30B) of at least one transition member (e.g., 20A to 20C). In other aspects, coupling device 40 engages, abuts, and/or frictionally seals against inner surfaces (e.g., 30B) of each of two opposing transition members (e.g., FIG. 1). Coupling device 40 can be retained between opposing transition members, and fixedly positioned therein upon application of grout, or other joining material at an interface between the transition members.

Coupling device 40 can comprise a body portion or body 44 configured to couple two or more ducts and/or segments having respective transition members 20A to 20C installed to and/or provided thereon. At least one coupler seal 42 can be provided about an outer surface of body 44. In some aspects, multiple coupler seals 42 are provided along and/or about outer surface of body 44. Coupler seals 42 can comprise separate members disposed between adjacent ribs R. In some aspects, coupler seals 42 comprise a gasket or gasket material adapted to seal a space disposed between an outer surface of body 44 and an inner surface of transition members 20A to 20C.

In some aspects, a plurality of perforations, vents, holes, openings, and/or apertures, generally designated 48 can be provided within and extend through portions of body 44 for facilitating the passage of a fluid, grout, and/or any other medium therethrough. In some aspects, body 44 is hollow, such that fluid, strands, tendons, grout, or other material or medium communicates between hollow body 44 of coupling device 40 and hollow body 24 of transition members 20A to 20C. Body 44 can comprise a substantially constant inner diameter (e.g., $D_{40}$, FIG. 4B) and a substantially constant outer diameter. In some aspects, body 44 comprises an outer diameter that is approximately equal to or slightly larger than diameter $D_B$, such that coupling device 40 is prevented from fully extending within both portions (e.g., 24A and 24B) of body 24, as coupling device 40 is configured to abut against transition region 26 of transition member 20A, 20B, or 20C.

Body 44 of device 40 can comprise a first end 46A and a second end 46B. Body 44 can comprise a substantially planar and smooth outer surface, or a non-planar outer surface having one or more ribs R. In some aspects, body 44 comprises a portion of corrugated plastic. Coupler seal 42 is disposed about body 44, and in some aspects, comprises a separately formed annular ring. In other aspects, coupler seal 42 is integrally formed with body 44. Coupler seal 42 can comprise an elastomer, elastomeric, polymer, polymeric, and/or rubber material. In some aspects, a diameter of coupler seal 42 is compressible and larger than a diameter of each duct (e.g., $D_1$, $D_2$ FIG. 4A) to be coupled, even when compressed. In some aspects, coupler seals 42 can be stretched and slipped over one end of body 44, and retained about body 44 between one or more ribs R. Coupler seals 42 can also be frictionally retained over body 44.

In some aspects, apertures 48 are provided proximate the end portions or ends 46A and 46B of coupling device 40. For example, at least some apertures of the plurality of apertures 48 are provided proximate first end 46A of device 40 and at least some other apertures of the plurality of apertures 48 are provided on second, opposing end 46B of coupling device 40. Apertures 48 can be provided over a majority surface area of body 44 or less than a majority surface area of body 44, in a uniform or a non-uniform arrangement. In some aspects, grout, oil, grease, wax, fluid, or any other material or medium can pass between and/or through at least some of the plurality of apertures 48 when coupling device 40 is installed between one or more transition members 20A to 20C.

FIGS. 4A and 4B illustrate a coupler or coupling system, generally designated 50, for assembling ducts and/or concrete segments. Referring to FIG. 4A, system 50 comprises a duct coupling system 10 provided between at least a first duct segment $D_1$ and a second duct segment $D_2$. In some aspects, transition members 20A and 20B and/or coupler 40 of coupling system 10 can be assembled or installed to non-touching and/or non-overlapping ducts $D_1$ and $D_2$ prior to the ducts being cast within a concrete segment as illustrated by FIG. 4A. In other aspects, transition members 20A and 20B and/or coupler 40 of coupling system 10 can be assembled or installed to ducts $D_1$ and $D_2$ that are pre-cast within respective concrete segments, $S_1$ and $S_2$. In some aspects, transition members 20A and 20B can be installed to ducts $D_1$ and $D_2$ via welding or other attachment method, and then the transitions members and ducts can be collectively cast within concrete, thereby forming segments $S_1$ and $S_2$. Coupling device 40 can then be installed between transition members 20A and 20B of adjacent concrete segments.

Transition members 20A and 20B can be fusion welded or otherwise attached to opposing ends of ducts $D_1$ and $D_2$ as indicated by a seam or attachment point 52. In some aspects, transition members 20A and 20B can abut, but not overlap ducts $D_1$ and $D_2$. As FIGS. 4A and 4B further illustrate, coupling device 40 is provided between larger diameter portions (e.g., $D_A$) of transition members 20A and 20B. In the connected state, coupling device 40 abuts against transition regions 26 of transition members 20A and 20B, and coupler seals 42 abut, frictionally engage, and/or otherwise seal against inner surfaces of transition members 20A and 20B. Coupling device 40 is fixedly held between transition regions 26 of opposing transition members 20A and 20B. Notably, the interior hollow passages of adjacent ducts $D_1$ and $D_2$ connect and/or communicate via coupling device 40. That is, device 40 provides a hollow conduit or path between first and second ducts, such that tendons, strands, or post-tensioning elements and/or grout can be uniformly disposed within and through system 50. In some aspects, ducts $D_1$ and $D_2$, body 44 of device 40, and transition members 20A and 20B can each comprise a polymeric or plastic material, such as poly(p-phenylene oxide) (PPO) or poly(p-phenylene ether) (PPE).

In some aspects, upon installation of coupling device 40, coupler seals 42 are provided proximate to and/or adjacent the transition region 26 of each coupler transition member 20A and 20B. In other aspects, coupler seals 42 are disposed inboard of transition region 26, between the larger diameter openings 22A of adjacent transition members 20A and 20B. In some aspects, each coupler seal 42 is configured to seal an annular space disposed between the outer surface of coupling device 40 and an inner surface of each transition member 20A/20B to be coupled thereto.

Referring to FIG. 4B, first and second ducts $D_1$ and $D_2$ to be coupled via system 10 can be pre-cast within respective first and second concrete bulkheads or segments, generally designated $S_1$ and $S_2$. Ducts $D_1$ and $D_2$ can comprise elongated, hollow bodies provided within concrete segments for structurally reinforcing the concrete and/or structures formed therefrom. In some aspects, a transverse joint 54 is disposed between opposing concrete segments $S_1$ and $S_2$ and respective ducts to be coupled. Joint 54 can comprise a shear key, a wet joint, an epoxy joint, and/or a dry joint. In some aspects, joint 54 is grouted for improved sealing between faces of opposing segments $S_1$ and $S_2$. Faces of concrete segment can also be joined via epoxy. Joint 54 can comprise a transverse joint between opposing concrete bulkheads, and a gap can be between segments, the gap can comprise a variable width or a constant width. In other aspects, adjacent segments may be flush, such that no gap or joint forms therebetween.

Ducts $D_1$ and $D_2$ can comprise substantially a diameter, $D_X$ that is substantially equal to second diameter $D_B$ of transition member 20A. Ducts having different diameters can also be coupled. Coupling device 40 comprises a diameter $D_{40}$ that is approximately equal to, or slightly larger than each of $D_X$ and $D_B$, such that device 40 does not fully extend within transition member 20A and/or ducts. Coupling device 40 can be retained between opposing ducts, opposing transition members, and/or concrete segments and fixedly held therebetween upon application of grout or other fixing agent (e.g., G, FIG. 5B) within joint 54, thereby coupling the opposing ducts and/or segments.

In some aspects, a sealing element, such as a rod, plug, or pin P can be installed between opposing segments $S_1$ and $S_2$ prior to providing grout (e.g., G, FIG. 5D) within portions of joint 54. In some aspects, a sealing element comprised of foam or any other sealant material adapted to prevent leakage of grout from between segments $S_1$ and $S_2$ can be provided in joint 54. As FIG. 4B illustrates, the opposing faces of concrete segments $S_1$ and $S_2$ can be non-planar about flared ends of transition members 20A and 20B. Grout can be applied to joint 54, and flow between transition members 20A, 20B, and into ducts $D_1$ and $D_2$ via apertures 48 disposed within coupling device 40.

Figure 5A:
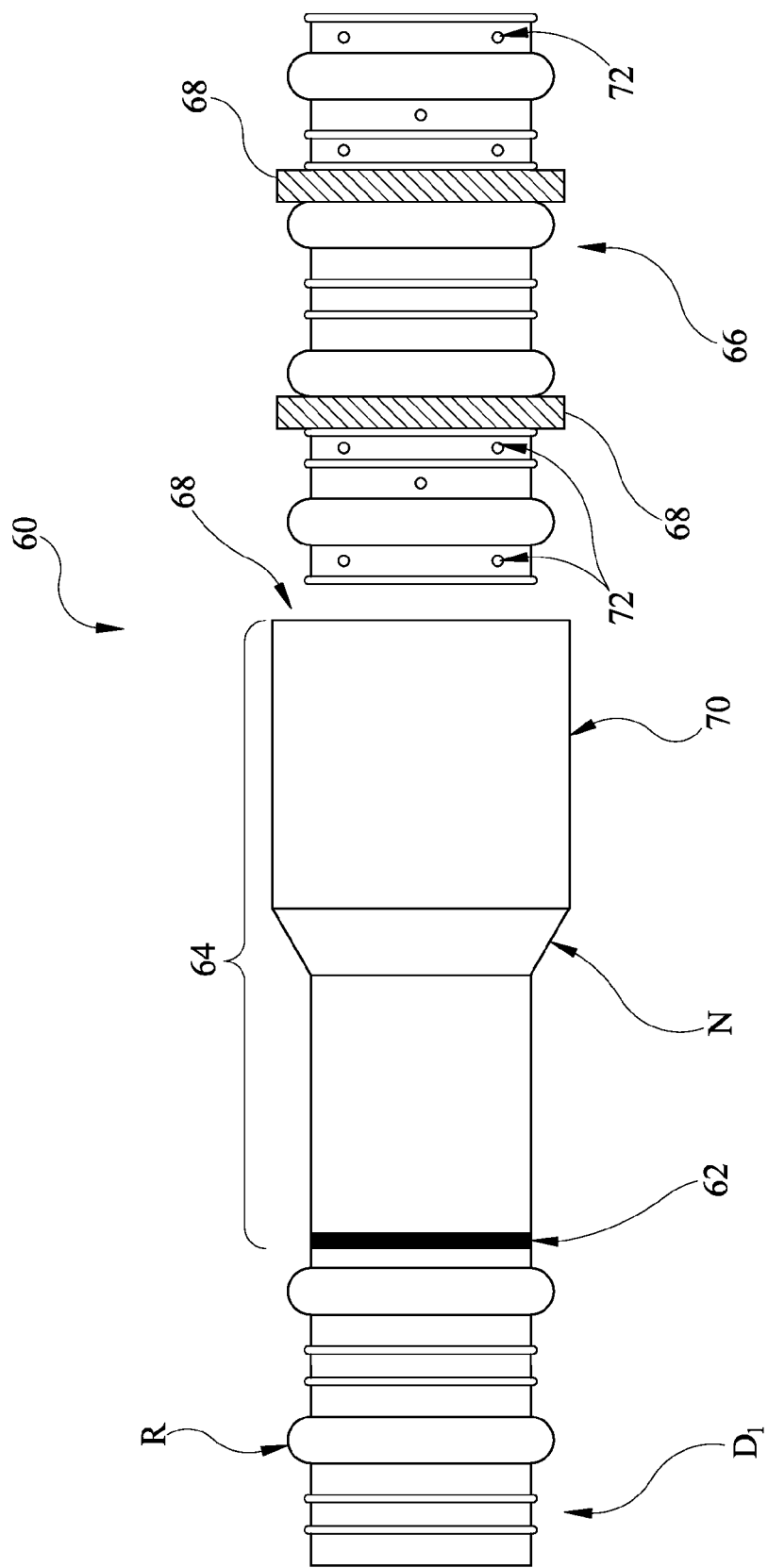

FIGS. 5A to 5D illustrate further embodiments of coupling devices, systems, and related methods for assembling ducts and/or concrete segments containing ducts. Referring to FIG. 5A, a coupling system, generally designated 60 is illustrated. Coupling system 60 is joined, connected, or otherwise attached to at least one duct $D_1$ via any attachment method, such as fusion welding, as indicated by a seam 62 or attachment point. Coupling system 60 comprises at least one transition member 64 configured to extend from a duct $D_1$ to be joined. Transition member 64 is adapted to receive a coupling device 66. Coupling device 66 can be inserted within an opening of a first end 70 of transition member 64, and coupled thereto. In some aspect, coupling device 66 frictionally engages an inner surface of transition member 64 via one or more coupler seals 68.

In some aspects, coupling device 66 is prevented from fully extending into and/or through transition member 64 (e.g., into duct $D_1$) via a neck region or neck portion N, which inclines such that a diameter of transition member 64 is smaller than coupling device 66. Thus, coupling device 66 cannot extend fully within and/or fully penetrate a full length of transition member 64. As FIG. 5A illustrates, transition member 64 can be devoid of a flared end, but can comprise a substantially non-flared end for positioning within a substantially vertical or planar-faced bulkhead.

Still referring to FIG. 5A, apertures 72 can be provided through and/or within one or more portions of coupling device 66. Apertures 72 can be provided proximate outermost distal regions of coupling device 66, a central region of coupling device, or both. A sealing and/or grouting material is adapted to pass between apertures 72 for securing structural components within the internal passage of coupling device 66 and duct $D_1$, to which coupling device 66 is in fluid communication with.

FIG. 5B illustrates opposing ducts $D_1$ and $D_2$ comprise transition members 64 provided thereon and/or secured or joined thereto. In some aspects, transition members 64 are fusion welded to ducts. First and second ducts $D_1$ and $D_2$, as well as transition members 64 can be pre-cast within first and second concrete segments $S_1$ and $S_2$, respectively. Coupling device 66 can be provided between the pre-cast segments $S_1$ and $S_2$, and inserted into between opposing ends 70 of opposing transition members 64. Coupling device 66 can secure segments $S_1$, $S_2$ via frictional engagement between coupling device 66 and transition members 64. Coupling device 66 can also become permanently or at least semi-permanently secured between segments $S_1$, $S_2$ upon application of grout (e.g., G, FIG. 5D) or other fixing agent to the joint between adjacent segments $S_1$, $S_2$.

FIG. 5C illustrates coupling device installed within an end of one transition member 64 and pre-cast segment $S_2$. Once secured within a first transition member 64, the remaining segment can be moved or pushed towards coupling device 66 and joined thereto. Thus, coupling device 66 can be installed between duct segments (e.g., $D_1$, $D_2$) and respective concrete segments (e.g., $S_1$, $S_2$).

Figure 5D:
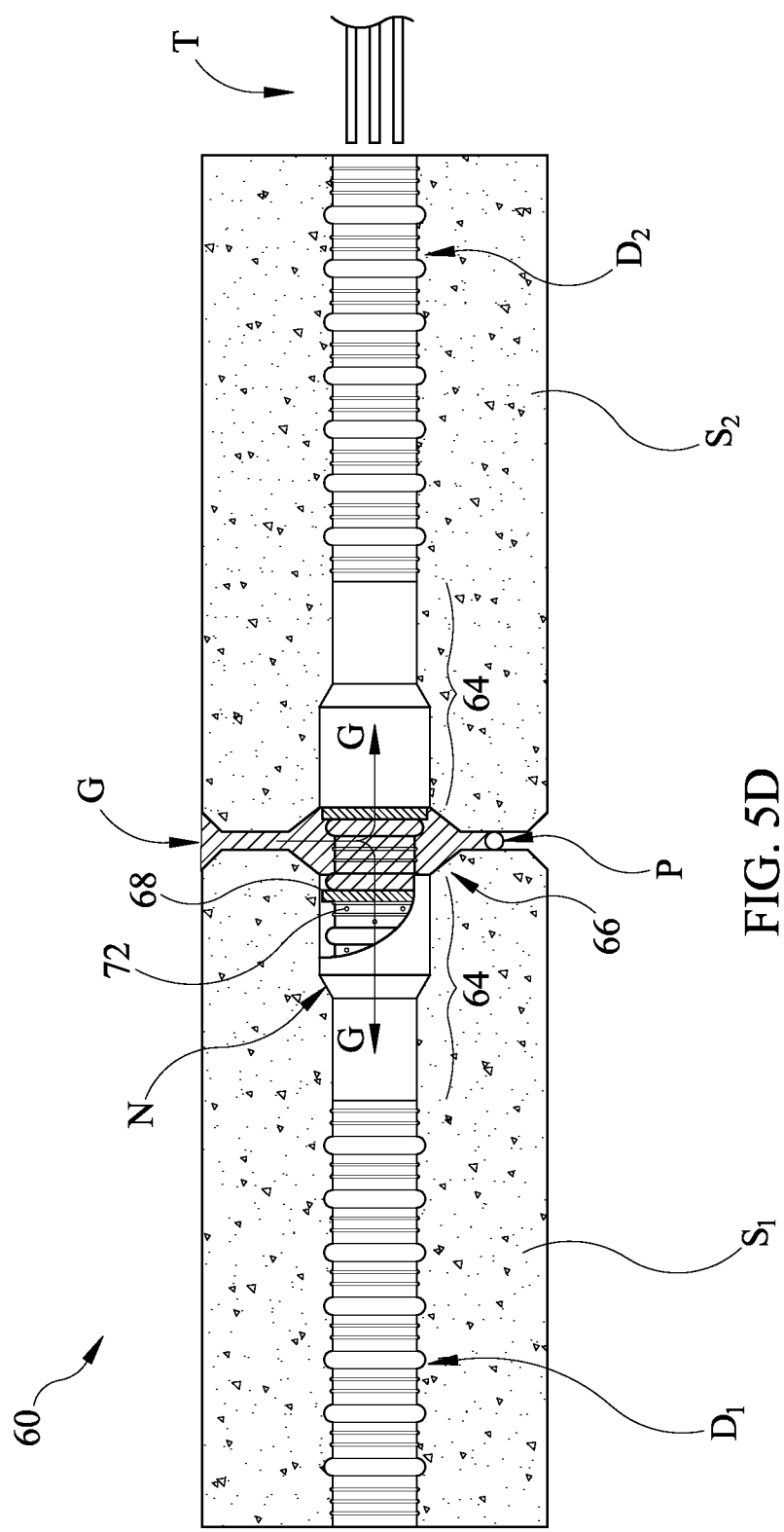

In FIG. 5D, grout G (or any other suitable material, e.g., concrete, epoxy, etc.) can be applied to the joint between adjacent and opposing concrete segments $S_1$ and $S_2$. The gap disposed between opposing faces of segments $S_1$ and $S_2$ can be grouted for improved sealing therebetween. Grout G can flow into the joint and at least up to and/or between coupler seals 68, as indicated by the hatched area illustrated in FIG. 5D. Grout G can fill the space between segments $S_1$ and $S_2$ for improved structural durability.

In some aspects, metallic strands, bars, or tendons T can be inserted within the ducts for improved strength. Once installed, tendons T can extend through each of first duct $D_1$, coupling device 66, and second duct $D_2$. Tendons T can then be post-tensioned for forming a structure from concrete segments (e.g., bridges, roadways, buildings, etc.). Grout G can flow within ducts $D_1$ and $D_2$ for securing tendons T therein.

After installation/insertion of tendons T, and in a subsequent operation, additional grout G, or any other suitable material (e.g., concrete, epoxy, etc.), can be applied within the annular spaces inside each duct $D_1$, $D_2$. Grout G can flow about and secure tendons T within ducts $D_1$, $D_2$. Grout G (e.g., or other material applied to the annular space within each duct $D_1$, $D_2$) can also flow between coupling device 66 and adjacent ducts $D_1$, $D_2$ via apertures 72 (FIG. 5A) as the coupling device 66 and ducts $D_1$, $D_2$ collectively form an end-to-end passageway.

FIGS. 5A to 5D collectively illustrate a method including providing a duct $D_1$, securing and/or joining a transition member 64 with the duct (e.g., via fusion welding, etc.), casting the joined duct $D_1$ and transition member 64 within concrete, providing a coupling device 66, inserting and/or installing coupling device 66 within a portion of transition member 64 causing coupling device to become frictionally engaged within therein, pouring a shear key, installing tendons, post tension tendons, and grouting tendons by dispensing grout within the coupler and network of ducts. Grout G can flow between ducts via apertures 72 (FIG. 5A) provided within coupling device 66. Grout G can also flow from the joint between adjacent segments $S_1$, $S_2$.

In some aspects, duct coupling device 66 is pre-installed in one of the first or second coupler transitions or transition members 64. The duct coupling device can be pre-installed in a coupler transition prior to assembling one or more concrete segments.

Embodiments as disclosed herein may provide one or more of the following beneficial technical effects: improved efficiency of coupling concrete segments; improved structural durability; improved ease of manufacture; improved ease of sealing and/or coupling; improved grouting; improved sealing at joints between adjacent concrete segments; lowered cost; improved customization of couplers for facilitating coupling of ducts and segments of various sizes and/or applications.

While the devices, systems, and methods have been described herein in reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure.

Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A duct coupling system comprising:
   first and second ducts; and
   a duct coupling device, the duct coupling device comprising:
      a body having opposing end portions; and
      at least two sealing members;
   the first duct including a first coupler transition configured to receive a first end of the duct coupling device; and
   the second duct including a second coupler transition configured to receive a second end of the duct coupling device;
   wherein the sealing members are each configured to seal an annular space disposed between a first surface of the duct coupling device and a surface of the first and second coupler transitions,
   wherein the coupling device comprises at least one or more apertures on each of the opposing end portions for passage of a fluid medium between the duct coupling device and the first and second coupler transitions.

2. The coupling system of claim 1, wherein the body is devoid of apertures between the sealing members.

3. The coupling system of claim 1, wherein the sealing members are provided over an outer surface of the body of the duct coupling device.

4. The coupling system of claim 1, wherein two spaced apart sealing members are provided over an outer surface body of the duct coupling device.

5. The coupling system of claim 1, further comprising a plurality of strands or bars extending between each of the first duct, the second duct, and the coupling device.

6. The coupling system of claim 1, further comprising grout disposed between portions of the first duct, the second duct, and the coupling device.

7. The coupling system of claim 1, wherein the first duct and the second duct do not touch or overlap.

8. The coupling system of claim 1, wherein the sealing member comprises an elastomer or rubber material.

9. The coupling system of claim 1, wherein the body of the coupling device is disposed between the first coupler transition and the second coupler transition.

10. The coupling system of claim 9, wherein a first end of the body is receivable in a first opening of the first coupler transition, and wherein a second end of the body is receivable in a second opening of the second coupler transition.

11. The coupling system of claim 1, wherein the first and the second ducts are provided in a concrete bulkhead.

12. The coupling system of claim 11, wherein a transverse joint between opposing concrete bulkheads and opposing first and second ducts comprises at least one of a shear key, wet joint, epoxy joint, and dry joint.

13. A duct coupling system comprising:
   two concrete segments, and
   a duct coupling device comprising:
      a body having opposing end portions; and
      at least two sealing members;
   a first coupler transition configured to receive a first end of the duct coupling device; and
   a second coupler transition configured to receive a second end of the duct coupling device;
   wherein the sealing members are each configured to seal an annular space disposed between a first surface of the duct coupling device and a surface of the first and second coupler transitions,
   wherein the coupling device comprises at least one or more apertures on each of the opposing end portions for passage of a fluid medium between the coupling device and the first and second coupler transitions, and
   wherein the coupling device is configured to join the concrete segments such that there is a gap between faces of the concrete segments.

14. The coupling system of claim 13, wherein the gap between the concrete segments comprises a wet joint or an epoxy joint.

15. A method for coupling ducts, the method comprising:
   providing a first coupler transition on a first duct;
   providing a second coupler transition on a second duct; and providing a duct coupling device between the first and second coupler transitions, wherein the duct coupling device comprises:

a sealing member configured to seal an annular space between a surface of the duct coupling device and surfaces of each coupler transition; and one or more apertures on opposing end portions.

16. The method of claim 15, further comprising casting portions of each duct and each respective coupler transition in concrete.

17. The method of claim 15, further comprising coupling a portion of the first duct with a portion of the second duct via the duct coupling device before or after each a concrete segment is formed.

18. The method of claim 15, wherein the first and second ducts are coupled via the duct coupling device without touching or overlapping.

19. The method of claim 15, further comprising pre-installing the duct coupling device in one of the first or second coupler transitions.

20. The method of claim 19, further comprising pre-installing the duct coupling device in one of the first or second coupler transitions before assembling one or more concrete elements or concrete segments.

21. The method of claim 15, further comprising inserting at least one of strands, bars, and tendons into portions of the first and second ducts.

22. The method of claim 21, further comprising providing grout in portions of the first and second ducts after the plurality of strands or tendons are inserted.

23. The method of claim 22, further comprising passing grout through the apertures and between the duct coupling device and the first and second ducts.

* * * * *